(12) United States Patent
Hodgkinson

(10) Patent No.: US 11,014,105 B2
(45) Date of Patent: May 25, 2021

(54) MULTI-SEGMENT HEATED HOSE HAVING SEGMENT-SPECIFIC HEATING MEANS

(71) Applicant: Akurate Dynamics, LLC, Houston, TX (US)

(72) Inventor: Andy Hodgkinson, Houston, TX (US)

(73) Assignee: Akurate Dynamics, LLC, Houston, TX (US)

( * ) Notice: Subject to any disclaimer, the term of this patent is extended or adjusted under 35 U.S.C. 154(b) by 238 days.

(21) Appl. No.: 15/784,886

(22) Filed: Oct. 16, 2017

(65) Prior Publication Data

US 2018/0117609 A1      May 3, 2018

Related U.S. Application Data

(60) Provisional application No. 62/408,731, filed on Oct. 15, 2016.

(51) Int. Cl.

| | |
|---|---|
| *B05B 7/16* | (2006.01) |
| *B05B 11/00* | (2006.01) |
| *H05B 1/02* | (2006.01) |
| *H05B 3/78* | (2006.01) |
| *B05B 12/10* | (2006.01) |
| *B05B 7/22* | (2006.01) |
| *B05B 7/04* | (2006.01) |
| *G05D 23/19* | (2006.01) |
| *B05B 7/00* | (2006.01) |

(52) U.S. Cl.
CPC .............. *B05B 7/1693* (2013.01); *B05B 7/04* (2013.01); *B05B 7/22* (2013.01); *B05B 11/0002* (2013.01); *B05B 12/10* (2013.01); *G05D 23/1934* (2013.01); *H05B 1/0244* (2013.01); *H05B 3/78* (2013.01); *B05B 7/0018* (2013.01)

(58) Field of Classification Search
None
See application file for complete search history.

(56) References Cited

U.S. PATENT DOCUMENTS

| | | | | |
|---|---|---|---|---|
| 972,131 | A * | 10/1910 | Shoenberg et al. | ... F24H 3/0405 |
| | | | | 392/485 |
| 1,344,303 | A * | 6/1920 | Little | ........................ F02M 1/00 |
| | | | | 219/206 |
| 1,474,528 | A * | 11/1923 | Hurst | ...................... F02N 19/10 |
| | | | | 219/208 |
| 2,809,268 | A | 10/1957 | Heron | |

(Continued)

FOREIGN PATENT DOCUMENTS

| | | |
|---|---|---|
| CN | 105525148 A | 4/2016 |
| DE | 20-2005-020930 U1 | 3/2007 |
| JP | 08-326983 A | 12/1996 |

OTHER PUBLICATIONS

International Search Report and The Written Opinion of the International Searching Authority, dated Dec. 26, 2017, 8 pages.

*Primary Examiner* — Thor S Campbell
(74) *Attorney, Agent, or Firm* — Blank Rome LLP

(57) ABSTRACT

A multi-segment, heated hose has temperature sensors at or near the outlet of each hose segment. Each hose segment also has separate means for heating a fluid in the hose segment. A heater power controller receives temperature data from each temperature sensor and independently adjusts the power to the heater in each hose segment to obtain and maintain a preselected fluid temperature at the outlet of each hose segment.

20 Claims, 5 Drawing Sheets

(56) References Cited

U.S. PATENT DOCUMENTS

| | | | |
|---|---|---|---|
| 2,883,513 A | 4/1959 | Schnabel | |
| 3,163,707 A * | 12/1964 | Darling | A47L 9/246 174/47 |
| 3,324,280 A | 6/1967 | Cheney et al. | |
| 3,746,832 A * | 7/1973 | Bernard | H01B 7/0072 219/137.9 |
| 3,754,118 A * | 8/1973 | Booker | H05B 3/82 219/523 |
| D267,906 S * | 2/1983 | Parise | D32/31 |
| 4,423,311 A * | 12/1983 | Varney, Sr. | E03B 7/14 392/468 |
| 4,436,983 A | 3/1984 | Solobay | |
| 4,501,952 A | 2/1985 | Lehrke | |
| 4,809,909 A | 3/1989 | Kukesh | |
| 5,129,034 A | 7/1992 | Sydenstricker | |
| 5,216,743 A | 6/1993 | Seitz | |
| 5,859,953 A * | 1/1999 | Nickless | F16L 53/38 392/489 |
| 5,892,887 A | 4/1999 | Thomas et al. | |
| 6,621,985 B1 * | 9/2003 | Thweatt, Jr. | F24H 1/225 392/465 |
| 7,034,258 B2 * | 4/2006 | Sutorius | B29C 45/2737 219/535 |
| 7,732,735 B2 * | 6/2010 | Bourget | B05B 7/1693 219/221 |
| 7,773,867 B2 * | 8/2010 | Bourget | G05B 19/048 392/468 |
| 7,991,273 B2 * | 8/2011 | Sonderegger | F16L 53/38 392/478 |
| 8,028,721 B2 * | 10/2011 | Koskey, Jr. | F16L 53/38 138/33 |
| 8,180,207 B2 * | 5/2012 | Shirai | E03D 9/08 392/465 |
| 8,291,939 B2 * | 10/2012 | Ferrone | A01K 7/027 138/33 |
| 8,380,056 B2 * | 2/2013 | Evans | F24H 1/142 392/465 |
| 9,156,046 B2 | 10/2015 | Jerdee et al. | |
| 9,410,652 B2 * | 8/2016 | Ellis | H05B 3/145 |
| 9,464,747 B2 * | 10/2016 | Eckardt | F16L 53/38 |
| 9,506,595 B2 * | 11/2016 | Eckardt | F16L 53/38 |
| 9,671,053 B2 * | 6/2017 | Eckardt | F16L 53/38 |
| 9,895,708 B2 | 2/2018 | McAndrew et al. | |
| 10,159,996 B2 | 12/2018 | McAndrew et al. | |
| 10,190,716 B1 * | 1/2019 | Hodgkinson | B05B 7/22 |
| 2006/0252292 A1 * | 11/2006 | Sonderegger | F16L 53/38 439/191 |
| 2009/0034949 A1 * | 2/2009 | Sawada | F24H 1/102 392/488 |
| 2010/0111708 A1 | 5/2010 | Seto et al. | |
| 2010/0193530 A1 * | 8/2010 | Leonard | F01N 3/2066 220/694 |
| 2011/0299839 A1 * | 12/2011 | Harbour | A01K 7/027 392/472 |
| 2014/0209630 A1 | 7/2014 | O'Leary et al. | |
| 2017/0122475 A1 * | 5/2017 | Jerdee | F16L 53/30 |

\* cited by examiner

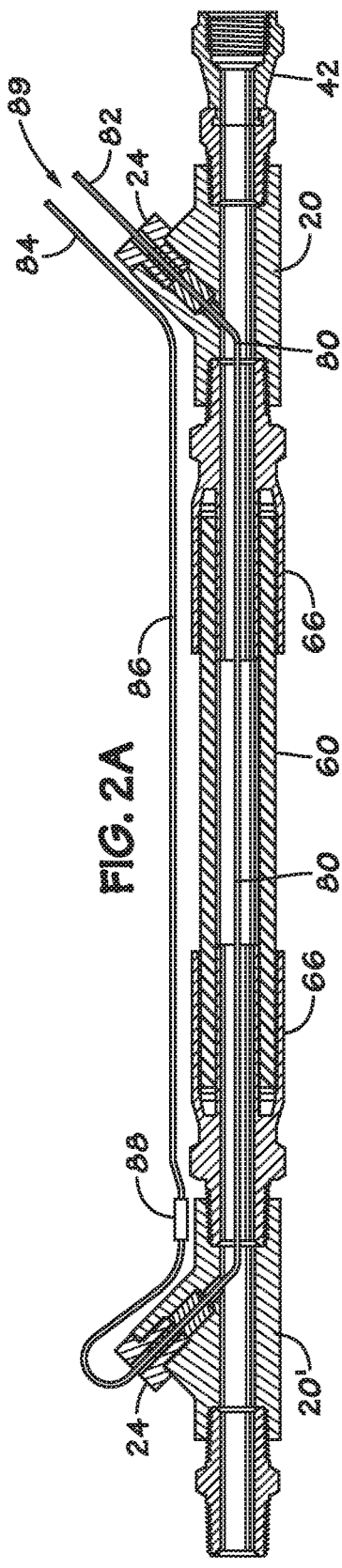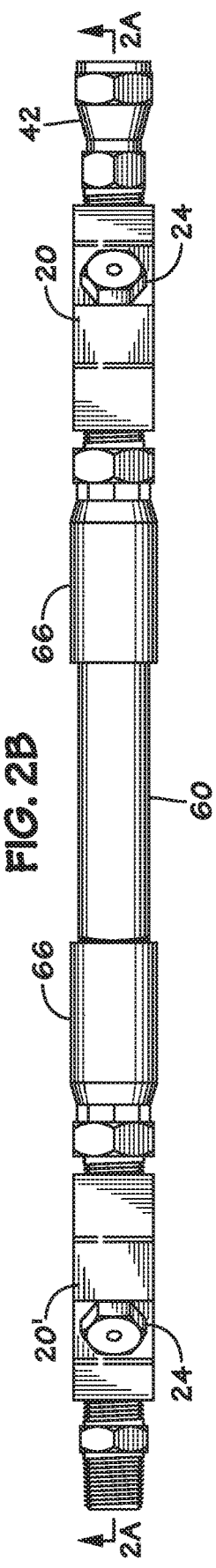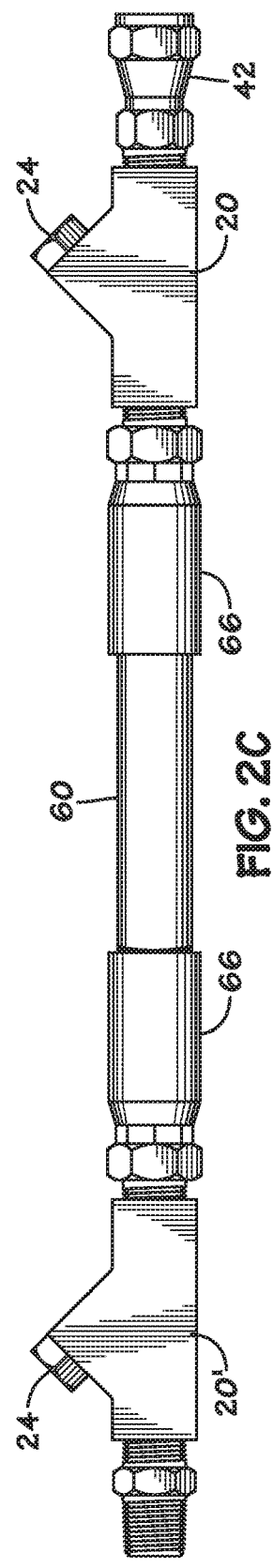

MULTI-SEGMENT HEATED HOSE HAVING SEGMENT-SPECIFIC HEATING MEANS

CROSS-REFERENCE TO RELATED APPLICATIONS

This application claims the benefit of U.S. Provisional Application No. 62/408,731 filed on Oct. 15, 2016, the contents of which are hereby incorporated by reference in their entirety.

FEDERALLY SPONSORED RESEARCH OR DEVELOPMENT

Not Applicable

BACKGROUND OF THE INVENTION

1. Field of the Invention

The present invention generally relates to fluid transport systems. More particularly, it relates to heated, flexible hoses for the delivery of chemical reactants to an application device such as a spray nozzle.

2. Description of the Related Art Including Information Disclosed Under 37 CFR 1.97 and 1.98

U.S. Pat. No. 2,809,268 to Heron describes flexible, electrically heated hoses of the kind comprising an electric heating conductor incorporated in the body of the hose and used for heating fluids, e.g. liquids, passing through the hose.

U.S. Pat. No. 2,883,513 to Schnabel describes a hose assembly with an internal electrical heating element comprising a flexible hose of metal-reinforced nonmetallic material, an electrical heating element disposed within the hose and extending throughout its length, an end fitting for the hose having a nipple and a socket concentrically disposed within and without the end of the hose, respectively, at an end thereof, and an insulated flexible metal lead-in connected at one end to the heating element and passing outwardly between the nipple and the inner surface of the hose and back over the outer surface of the hose between the hose and the socket such that an external electrical connection can be made to the other end of the lead-in, the nipple and the socket compressing the end of the hose and the lead-in there between so as to effect a fluid-tight seal between the end fitting and the hose.

U.S. Pat. No. 4,501,952 to Lehrke describes a fluid heater, particularly for heating paints, lacquers, varnishes and other spray coating material that includes an elongated hollow tube adapted to be inserted into a fluid flow line for fluid flow through the tube. An electric resistance heater is disposed within the tube and is surrounded by a helical coil member to create a helical fluid flow path through the tube. A temperature control system for regulating the operation of the heater includes a temperature sensing probe comprising a temperature responsive resistance element enclosed in a conical housing extending into the helical fluid flow path and having its apex contacting the heater and its conical surface area increasing in a direction away from the heater and extending across the cross section of the fluid flow path. The temperature control system is responsive to both the temperature and the rate of change of temperature of the probe and includes an ambient temperature compensation circuit for monitoring the ambient temperature and compensating temperature control circuits for regulating heater temperature as a function of ambient temperature as well as a function of static and dynamic fluid flow conditions in the helical flow path sensed by the probe.

U.S. Pat. No. 9,156,046 to Jerdee et al. describes a liquid in a conduit heater assembly that includes a plurality of heater modules each having a plurality of bores forming at least a first component path and a second component path, and at least one heating element receptacle configured to receive a heating element for heating the first and second component paths.

U.S. Publication No. 2017/0122475 by Jerdee et al. describes a modular fluid delivery assembly that comprises a fluid conduit. The modular fluid delivery assembly also comprises an electrical heating element disposed within the fluid conduit. The electrical heating element is configured to provide a heat source within the fluid conduit. The modular fluid delivery assembly also comprises a connection assembly, located proximate an end of the modular fluid delivery assembly, coupled to the heating element and the fluid conduit. The connection assembly is configured to provide a hydraulic coupling to the fluid conduit, and to provide an electronic coupling to the electrical heating element.

BRIEF SUMMARY OF THE INVENTION

A multi-segment, heated hose has temperature sensors at or near the outlet of each hose segment. Each hose segment also has separate means for heating a fluid in the hose segment. A heater power controller receives temperature data from each temperature sensor and independently adjusts the power to the heater in each hose segment to obtain and maintain a preselected fluid temperature at the outlet of each hose segment.

In certain embodiments, the heater is an electric resistance heater located within the flow channel of the hose segment.

BRIEF DESCRIPTION OF THE SEVERAL VIEWS OF THE DRAWING(S)

FIG. 2A is a cross-sectional view (taken along line A-A in FIG. 2B) of a single hose segment according to a second exemplary embodiment of the invention.

FIG. 2B is a top view of the embodiment illustrated in FIG. 2A.

FIG. 2C is a side view of the embodiment illustrated in FIG. 2A.

FIG. 3 is a schematic diagram of a multi-segment, heated hose according to the invention connected to a spray gun applicator.

FIG. 3A is a schematic diagram of a multi-segment, heated hose of the prior art connected to a spray gun applicator.

DETAILED DESCRIPTION OF THE INVENTION

Figure 1A:
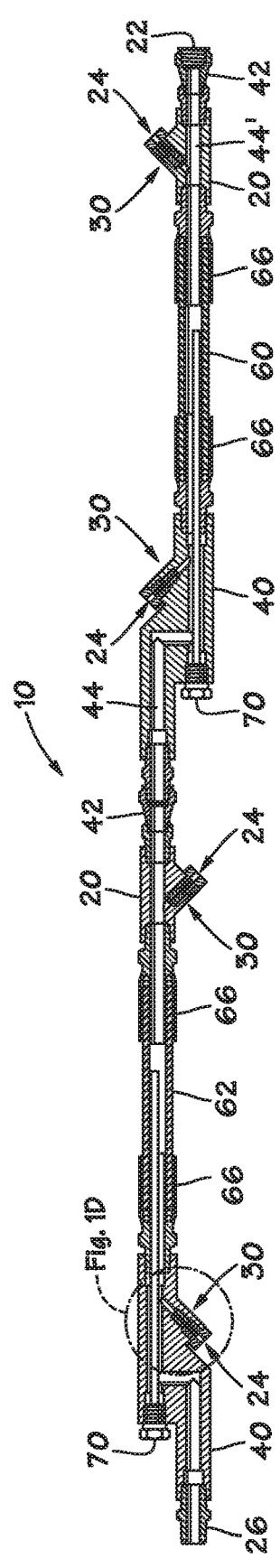
FIG. 1A is a cross-sectional view (taken along line A-A in FIG. 1B) of one particular exemplary embodiment of the invention.

The invention may best be understood by reference to the exemplary embodiments illustrated in the drawing figures wherein the following reference numbers are used:
 10 apparatus
 20 short pressure housing
 22 hose inlet
 24 heating element inlet/outlet
 26 hose outlet
 28 hose connection nipple
 30 pressure-sealed connection
 32 compression cap
 34 insulating insert
 36 compression bung
 40 long pressure housing
 42 swivel hose connector
 44 internal fluid conduit
 60 first hose
 62 second hose
 66 hydraulic hose crimp
 70 sensor
 80 heating element
 82 heater power input end
 84 heater power return end
 86 heater power return
 88 connection to heater power return wire
 89 flying leads
 90 power controller
 92 serial heater power
 92 hose segment 1
 94 hose segment 2
 95 hose segment 3
 96 spray gun
 97 temperature data line
 98 fluid inlet
 99 fluid outlet
 100 power controller
 101 power line 1 (to 104)
 102 power line 2 (to 105)
 103 power line 3 (to 106)
 104 hose segment 1
 105 hose segment 2
 106 hose segment 3
 107 temperature data line (from 106)
 108 temperature data line (from 105)
 109 temperature data line (from 104)

Figure 4A:
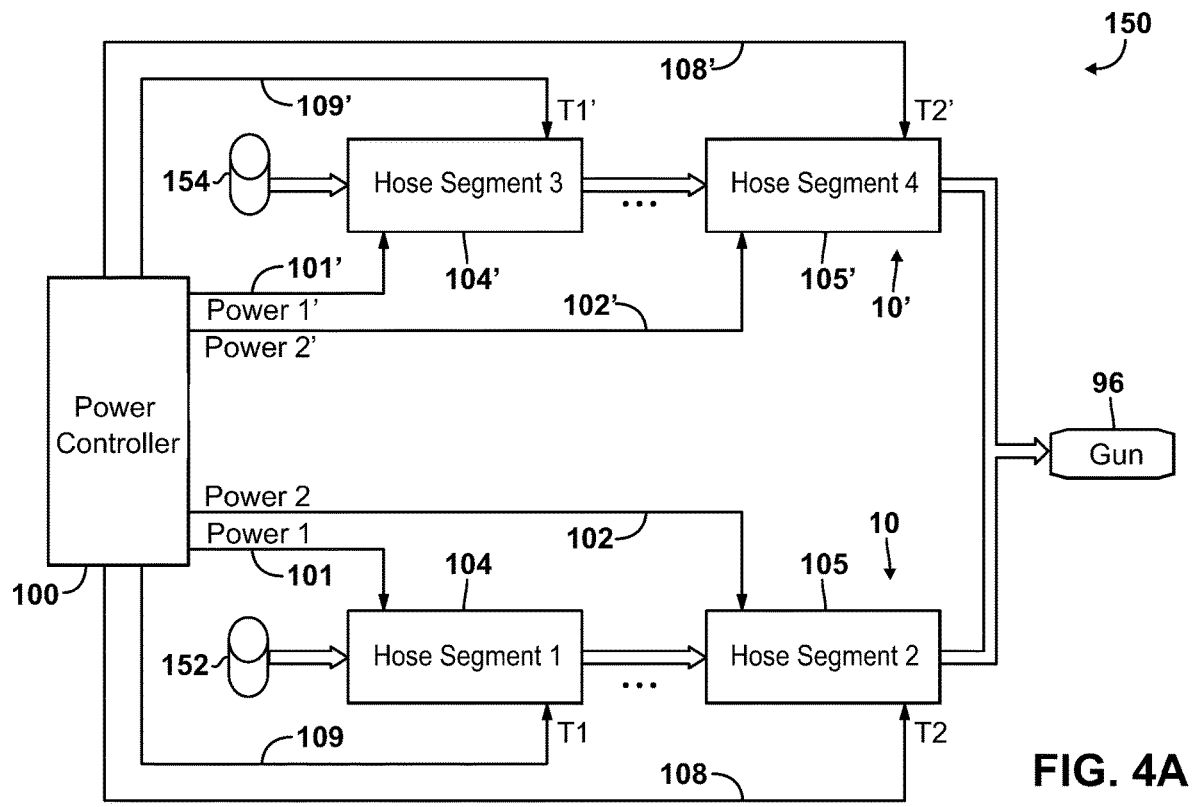
FIG. 4A-4B illustrate a spray foam application system having multi-segment, heated hoses according to the invention used in a method of applying spray foam.
Figure 4B:
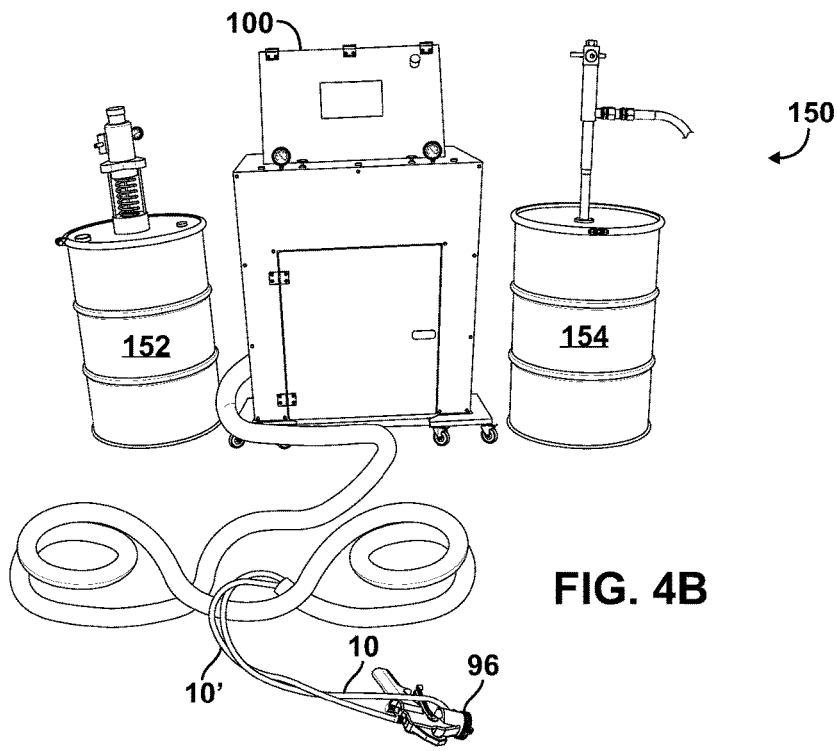

Referring to FIGS. 1A-2C, 3, and 4A-4B, apparatus 10 for heating a liquid in a conduit may have use in a wide variety of applications. One exemplary application is in a spray foam application system (150: FIGS. 4A-4B). Spray foam is a chemical product created by two materials, isocyanate (152) and a polyol resin (154), which react when mixed with each other and expand up to 60 times its liquid volume after it is sprayed in place. This expansion makes it useful as a specialty packing material which forms to the shape of the product being packaged and produces a high thermal insulating value with virtually no air infiltration. Spray foam insulation or spray polyurethane foam (SPF) is an alternative to traditional building insulation such as fiberglass. A two-component mixture composed of isocyanate (152) and a polyol resin (154) comes together at the tip of a gun (96) and forms an expanding foam that may be sprayed onto roof tiles, concrete slabs, into wall cavities, or through holes drilled into a cavity of a finished wall.

In such a multi-component sprayer system (150), the two (or more) liquid chemical reactants (152, 154) must be pumped to the spray gun (96). Each liquid reactant (152, 154) in the conduits (10, 10') leading to the gun (96) may have different physical and chemical properties, such as viscosity and temperature-dependent chemical reactivity. In order to properly coat an article or foam a cavity, the correct amounts and correct temperature of each liquid reactant (152, 154) are needed at the gun (96) in order to spray the mixture properly. Apparatus 10 of the present invention may be used to heat a liquid in a conduit to obtain or maintain a suitable viscosity and/or reactivity to be pumped and correctly proportioned with another liquid in another conduit, when mixed.

Apparatus 10 comprises a multi-segment hose with each hose segment having a short pressure housing 20 at a first end thereof and long pressure housing 40 at an opposing second end with heating elements 80 (see FIG. 2A) entering or exiting each hose segment through heating element inlets/outlets 24 on pressure housings 20 and 40 and extending through the interiors of first hose 60, second hose 62 and any additional hose segments attached thereto. Each long pressure housing may be equipped with a temperature sensor which may be used to regulate the power applied to the heating element in each individual segment.

Figure 1B:
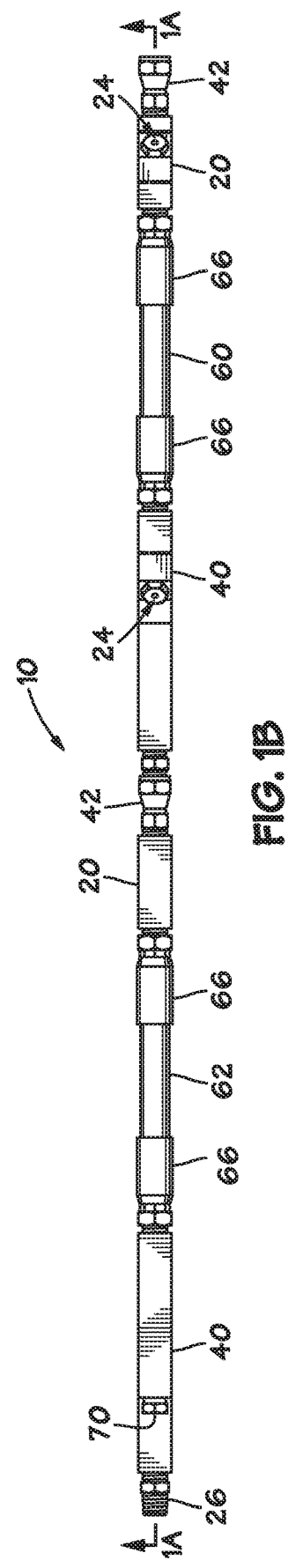
FIG. 1B is a top view of the embodiment illustrated in FIG. 1A.
Figure 1C:
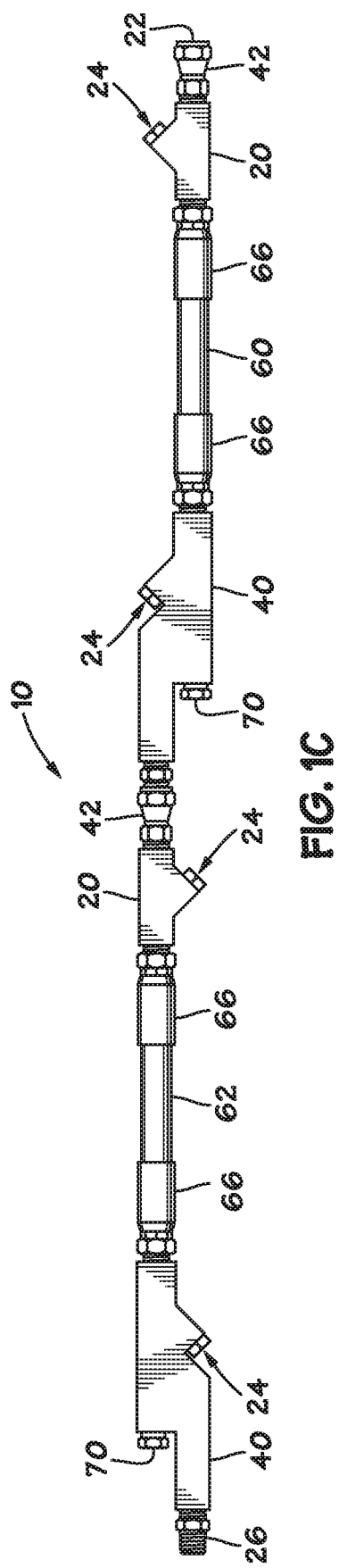
FIG. 1C is a side view of the embodiment illustrated in FIG. 1A.

FIGS. 1A-1D show a representative two-segment embodiment comprising a first hose 60 and a second hose 62 each having hydraulic crimp connectors 66 at the ends thereof. Inlet 22 of first hose 60 may have swivel hose connector 42 for flexible connection to an adjacent hose segment. Swivel hose connector 42 is attached to short pressure housing 20 at a first end thereof. Hose 60 is connected to an opposing second end of short pressure housing 20 which is in fluid communication with the first end via internal fluid conduit 44'. Short pressure housing 20 is equipped with a heating element inlet/outlet 24 for a heating element 80 (see FIG. 2A) in the flow path of hose 60. The exit of first hose 60 is connected to the inlet of long pressure housing 40 at a first end thereof which is in fluid communication with an outlet at an opposing second end via internal fluid conduit 44. Long pressure housing 40 is equipped with heating element inlet/outlet 24 for a heating element 80 (see FIG. 2A) in the flow path of hose 60. Long pressure housing 40 is additionally equipped with sensor 70 which may contact a fluid in internal fluid conduit 44. In an embodiment, sensor 70 is a temperature sensor. As shown in FIGS. 1A-1C, the inlet of a substantially similar hose assembly comprising hose 62 may be attached to the outlet of the assembly comprising hose 60. It will be appreciated that any number of additional hose assemblies may be fluid-connected in serial to achieve a desired total hose length.

FIGS. 2A-2C show how a heating element 80 may be positioned directly in the flow path of a hose segment.

Figure 1D:
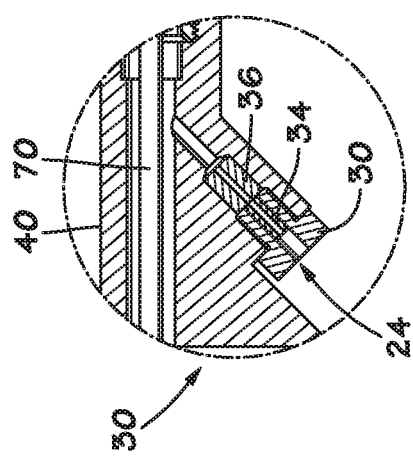
FIG. 1D is an enlarged view of the portion of FIG. 1A indicated as "A."
Figure 5:
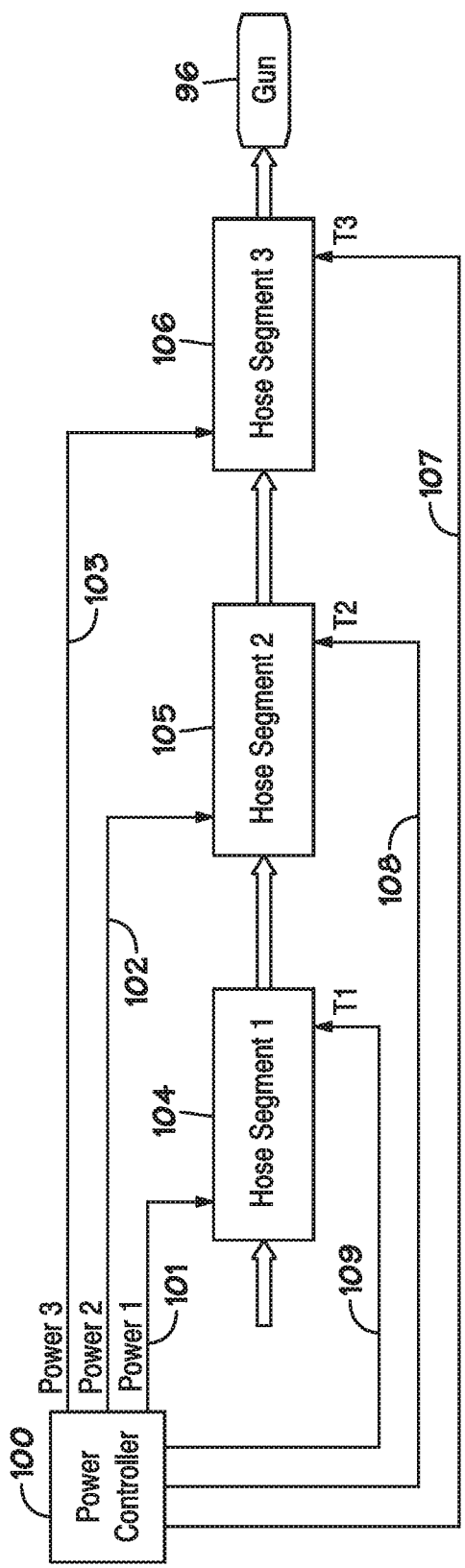
Figure 5A:
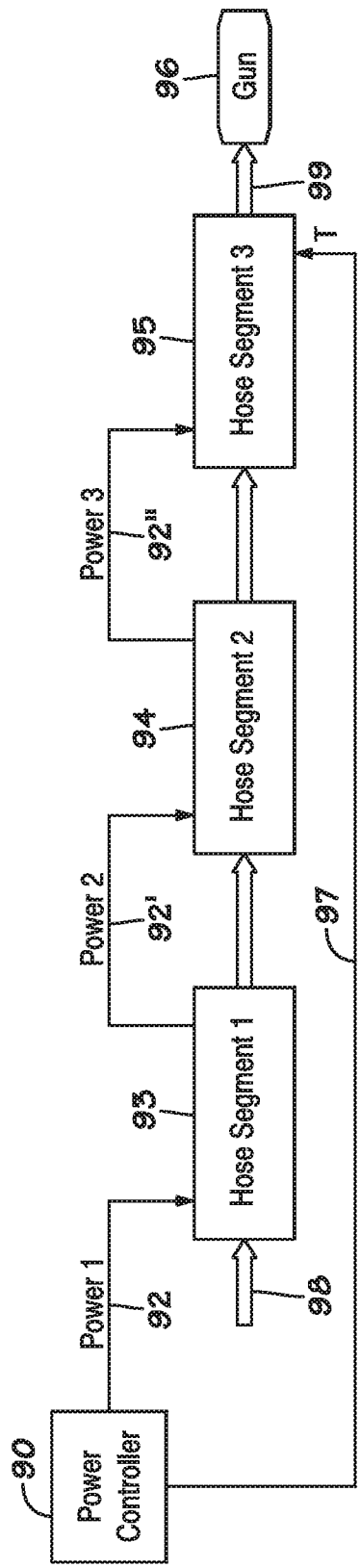

In some embodiments, there are means 30 for pressure-sealed connection in heating element inlet/outlet 24. FIG. 1D is an enlarged, isolated view of pressure-sealed connection means 30 comprising compression screw cap 32, insulating insert 34, and compression bung 36. Insulating insert 34 may be mounted on compression screw cap 32, and compression bung 36 may be adjacent insulating insert 34 to seal against the walls of heating element inlet 24 and heating element outlet 44. Heating element 80 passes through compression bungs 36 in heating element inlet 24 and heating element outlet 44 such that heating element 80 has a fluid-tight seal within hose 60.

FIGS. 2A-2C show an embodiment with a hydraulic hose crimps 66 at each end of hose 60. Crimps 66 provide a pressure-resistant seal for the connection of hose 60 to respective pressure housings 20.

Embodiments of the present invention include sensor 70 in long pressure housing 40. A heated liquid passing through long pressure housing 40 may be detected and measured by sensor 70. An accurate temperature may be measured with sensor 70 for a determination of the pressure required to dispense a heated liquid at a selected rate from apparatus 10 and whether the heated liquid has reached a suitable temperature to react properly with another liquid reactant with which it is to be mixed.

FIGS. 2A-2C show heating element 80 of apparatus 10. Heating element 80 has a line voltage end 82 and a voltage load end 84. Heating element 80 extends through heating element inlet/outlet 24 of first pressure housing 20, through hose 60, and through heating element inlet/outlet 24 of second end housing 20'. Heating element 80 passes through compression bung 36 for pressure-sealed relationship to long pressure housing 40 and hose 60. The flow path may be sealed so that pumping a liquid through apparatus 10 is not disrupted by the presence of heating element 80.

Heating element 80 may be a coated resistance wire or comprise other electrically powered heating means. In an embodiment, heating element 80 comprises an INCONEL® nickel-chromium alloy [HUNTINGTON ALLOYS CORPORATION, 3200 RIVERSIDE DRIVE, HUNTINGTON, WEST VIRGINIA 25705] having a TEFLON® polytetrafluoroethylene coating [E. I. DU PONT DE NEMOURS AND COMPANY, 1007 MARKET STREET, WILMINGTON, DELAWARE 19898]. The heat generated by resistance heating of the wire transfers to the liquid flowing in the conduit containing heating element 80. The liquid in the conduit may be heated directly in the flow channel of the conduit, and need not rely upon contact with the walls of the conduit as with hoses having heating means in a jacket surrounding the hose.

The illustrated embodiment of heating element 80 shows power input end 82 protruding from heating element inlet/outlet 24 of a first pressure housing 20, and power return end 84 protruding from heating element inlet/outlet 24 of a second pressure housing 20. A power supply (not shown) connects to ends 82, 84. The power supply may be an AC or DC power supply. The circuit is completed to generate heat from electric resistance heating in element 80 within hose 60. FIG. 2A further shows a return portion 86 along the outside of hose which may be the neutral line in an AC-powered system. In an embodiment, return portion 86 comprises an insulated, low-resistance conductor such as copper.

The present invention also includes the method of heating a liquid in a conduit using apparatus 10 of FIGS. 1A-1D equipped with the heating means shown in FIG. 2A. Apparatus 10 may be assembled and one or more additional hose segments may be added at outlet 26 so as to obtain a desired total hose length. Apparatus 10 forms a pressure-resistant, sealed flow path. Then, a liquid in a conduit at an initial temperature may be pumped into inlet 22 of the first short pressure housing 20. Following the flow path, the liquid may be pumped through hose 60 and heated within hose 60 (and subsequent hose segments) by heating element(s) 80. Heating element 80 may be connected to a power supply to generate heat within hose 60. The intimate contact with heating element(s) 80 increases the temperature of the liquid in a conduit so as to form a heated liquid at a desired temperature in long pressure housing 40, after being pumped through hose 60. After exiting outlet 26, the heated liquid may be mixed with one or more liquids in other conduits for coating or foaming by, for example, a multi-component sprayer (96: FIGS. 4A-4B).

Embodiments of the method further include detecting the temperature of the heated liquid in long pressure housing 40 with sensor 70. The data may be used to automatically adjust pumping rates, which affect the rate of heated liquid delivered for coating and foaming. In addition to (or in place of) temperature, viscosity or chemical reactivity could also be measured by sensor 70. This information may also be used to automatically adjust the power applied to heating element 80 so that the liquid in the conduit is in a desired state for mixing, coating, foaming, or the like.

The present invention provides an apparatus and method to heat a liquid in a conduit under pressure. Prior heat transfer means include heating the conduit in which the liquid is flowing from the outside of the conduit. The liquid in a conduit is heated from the outside in, so the heat transfer may not be very efficient or evenly distributed. Waste heat radiates outward from the wraps and layers, instead of moving inward to the liquid in the conduit. There is also waste heat from heating an entire metal module to get the correct amount of heat to the liquid in a conduit. In the present invention, the heating element maintains a liquid in a conduit at a desired temperature before mixing. The heating element is within a flow path of the liquid in a conduit for direct contact and heat transfer inside out, instead of outside in. Greater efficiency is achieved because there is less waste heat. The heat transfers outward into the liquid in a conduit, and radiating outward is no longer waste heat. Any loss of heat would result from the liquid in the conduit transferring heat to the conduit. This loss of heat may be balanced by compensating with increased heat from the heating element. The apparatus and method of the present invention efficiently provides highly controlled heat to better regulate the heated liquid in a conduit exiting the apparatus for coating and foaming in a multi-component sprayer system.

Referring now to FIGS. 3 and 3A, a multi-segment, heated hose of the prior art (FIG. 3A) will be contrasted to a multi-segment, heated hose according to the invention (FIG. 3).

In the system of the prior art (FIG. 3A), a fluid is pumped (under pressure) into inlet 98 of first hose segment 93 the outlet of which is in fluid communication with the inlet of second hose segment 94, the outlet of which is in fluid communication with the inlet of third hose segment 95 having outlet 99 which is in fluid communication with spray gun 96.

Each of first hose segment 93, second hose segment 94, and third hose segment 95 has means for heating the fluid passing through that hose segment. Power controller 90 may adjust the voltage and/or current and/or duty cycle in first power line 92. The heater in second hose segment 94 is wired in series with the heater in first hose segment 93 via second power line 92'. The heater in third hose segment 95 is wired in series with the heaters in first hose segment 93 and second hose segment 94 via third power line 92". A temperature sensor at or near outlet 99 of third hose segment 95 sends temperature data to power controller 90 via temperature data line 97. Power controller 90 adjusts its power output on first power line 92 to obtain and maintain a preselected desired fluid temperature at outlet 99.

As will be appreciated by those skilled in the art, a break in or disconnection of third power line 92" would disable the heater in third hose segment 95; a break in or disconnection of second power line 92' would disable the heaters in second hose segment 94 and third hose segment 95; and a break in or disconnection of first power line 92 would disable the heaters in each of hose segments 93, 94, and 95 as would a break in or disconnection of the power return line (not shown). Similarly, a break in or disconnection of temperature date line 97 would also disable the system inasmuch as power controller 90 would be unable to regulate the power to the heaters connected in serial. Moreover, it will also be appreciated that power controller 90 can only regulate the total power supplied to the heaters connected in series although the various hose segments (93, 94, 95) may be located in different environments and therefore require different heating power levels—e.g. first hose segment 93 may be located in a truck (together with power controller 90 and other heat-producing elements of the system) while second hose segment 94 is lying on snow-covered ground while third hose segment 95 is within a heated building.

As illustrated in FIG. 3, a system according to the invention solves these problems.

As in the systems of the prior art illustrated schematically in FIG. 3A, a fluid is pumped (under pressure) into the inlet of first hose segment 104 the outlet of which is in fluid communication with the inlet of second hose segment 105, the outlet of which is in fluid communication with the inlet of third hose segment 106 having an outlet which is in fluid communication with spray gun 96.

Each of first hose segment 104, second hose segment 105, and third hose segment 106 has means for heating the fluid passing through that hose segment. Each of first hose segment 104, second hose segment 105, and third hose segment 106 may also have a temperature sensor at or near its outlet with a separate, dedicate temperature data line (109, 108, and 107, respectively) connected to power controller 100. Each hose segment has means for heating the fluid passing through that hose segment. Power controller 100 may adjust the voltage and/or current and/or duty cycle in first power line 101 to provide a desired temperature at the outlet of first hose segment 104. Similarly, power controller 100 may independently adjust the voltage and/or current and/or duty cycle in second power line 102 and third power line 103 to provide desired temperatures at the outlets of second hose segment 105 and third hose segment 106. Even if the desired outlet temperatures at each of the hose segments are the same, power controller 100 may independently adjust the power supplied to the heater in each hose segment (which may be in a different environment than those of its adjacent hose sections).

It will be appreciated that in a system according to the invention, a break in or disconnection of any one of power lines 101, 102, or 103 or a break in or disconnection of any one of temperature data lines 107, 108, or 109 will not disable the entire system. If, for example, second power line 102 or second temperature data line 108 were broken or disconnected, power controller 100 could increase the power applied to the heater in first hose segment 104 and/or the heater in third hose segment 106 so as to maintain the desired, preset temperature at the outlet of third hose segment 106. Thus, a system according to the invention is more fault-tolerant than the systems of the prior art.

FIGS. 4A-4B illustrate a spray foam application system 150 having multi-segment, heated hoses 10, 10' according to the invention used in a method of applying spray foam. A first multi-segment, heated fluid conduit 10 is provided. This first conduit 10 comprises a first segment 104 having a first fluid inlet and a first fluid outlet in fluid communication with the first fluid inlet via a first fluid conduit; a second segment 105 having a second fluid inlet in fluid communication with the first fluid outlet and a second fluid outlet in fluid communication with the second fluid inlet via a second fluid conduit; a first heater 101 within a flow channel of the first segment; a second heater 102 within a flow channel of the second segment; a first temperature sensor 109 responsive to the temperature of a fluid at the first fluid outlet; a second temperature sensor 108 responsive to the temperature of a fluid at the second fluid outlet.

A second multi-segment, heated fluid conduit 10' is provided. The second conduit 10' comprises a third segment 104' having a third fluid inlet and a third fluid outlet in fluid communication with the third fluid inlet via a third fluid conduit; a fourth segment 105' having a fourth fluid inlet in fluid communication with the third fluid outlet and a fourth fluid outlet in fluid communication with the fourth fluid inlet via a fourth fluid conduit; a third heater 101' within a flow channel of the third segment 104'; a fourth heater 102' within a flow channel of the fourth segment 105'; a third temperature sensor 109' responsive to the temperature of a fluid at the third fluid outlet; a fourth temperature sensor 108' responsive to the temperature of a fluid at the fourth fluid outlet.

A power controller 100 is provided and has a first output connected to the first heater 101, a second output connected to the second heater 102, a third output connected to the third heater 101', and a fourth output connected to the fourth heater 102'. The power controller 100 is in data communication with the first temperature sensor 109, the second temperature sensor 108, the third temperature sensor 109', and the fourth temperature sensor 108'.

A spray gun 96 is provided in fluid communication with the first multi-segment, heated fluid conduit 10 and the second multi-segment, heated fluid conduit 10'.

An isocyanate (152) is pumped at a first selected temperature to the spray gun 96 via the first multi-segment, heated fluid conduit 10. A polyol resin (154) is pumped at a second selected temperature to the spray gun 96 via the second multi-segment, heated fluid conduit 10'. The isocyanate and the polyol resin (152, 154_ are mixed in the spray gun 96. The power controller 100 supplies power to the first heater 101 in response to the first temperature sensor 109 and the second heater 102 in response to the second temperature sensor 108 so as to maintain the first selected temperature, and the power controller 100 supplies power to the third heater 101' in response to the third temperature sensor 109' and the fourth heater 102' in response to the fourth temperature sensor 108' so as to maintain the second selected temperature.

The foregoing presents particular embodiments of a system embodying the principles of the invention. Those skilled in the art will be able to devise alternatives and variations which, even if not explicitly disclosed herein, embody those principles and are thus within the scope of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A multi-segment, flexible, heated hose system for applying spray foam from isocyanate and polyol resin, the multi-segment hose system comprising:
   a first multi-segment, flexible, heated hose to conduct the isocyanate, the first hose comprising:

a first segment having a first fluid inlet, a first fluid outlet, and a first flow channel, the first fluid outlet in fluid communication with the first fluid inlet via the first flow channel;

a second segment connected to the first segment and having a second fluid inlet, a second fluid outlet, and a second flow channel, the second fluid inlet in fluid communication with the first fluid outlet, the second fluid outlet in fluid communication with the second fluid inlet via the second flow channel;

a first heater disposed within the first flow channel of the first segment;

a second heater disposed within the second flow channel of the second segment;

a first temperature sensor responsive to the temperature of the fluid at the first fluid outlet;

a second temperature sensor responsive to the temperature of the fluid at the second fluid outlet;

a second multi-segment, flexible, heated hose to conduct the polyol resin, the second hose comprising:

a third segment having a third fluid inlet, a third fluid outlet, and a third flow channel, the third fluid outlet in fluid communication with the third fluid inlet via the third flow channel;

a fourth segment connected to the third segment and having a fourth fluid inlet, a fourth fluid outlet, and a fourth flow channel, the fourth fluid inlet in fluid communication with the third fluid outlet, the fourth fluid outlet in fluid communication with the fourth fluid inlet via the fourth flow channel;

a third heater disposed within the third flow channel of the third segment;

a fourth heater disposed within the fourth flow channel of the fourth segment;

a third temperature sensor responsive to the temperature of the polyol resin at the third fluid outlet;

a fourth temperature sensor responsive to the temperature of the polyol resin at the fourth fluid outlet;

a spray gun in fluid communication with the first and second hoses and being configured to mix the isocyanate and the polyol resin for delivery therefrom as the spray foam; and a power controller having a first output connected to the first heater, a second output connected to the second heater, a third output connected to the third heater, a fourth output connected to the fourth heater, the power controller in data communication with the first temperature sensor, the second temperature sensor, the third temperature sensor, the fourth temperature sensor, the power controller being configured to supply power independently to each of the outputs to heat the respective heater in response to data from the temperature sensors.

2. The multi-segment, flexible, heated hose system recited in claim 1 wherein the power controller adjusts the power supplied to the first output in response to the data from the first temperature sensor.

3. The multi-segment, flexible, heated hose system recited in claim 1 wherein the power controller independently adjusts first of the power supplied to the first output in response to first of the data from the first temperature sensor and adjusts second of the power supplied to the second output in response to second of the data from the second temperature sensor.

4. The multi-segment, flexible, heated hose system recited in claim 1 wherein the power controller adjusts the power supplied to the first output in response to first of the data from the first temperature sensor and second of the data from the second temperature sensor.

5. The multi-segment, flexible, heated hose system recited in claim 1 wherein the power controller adjusts the power supplied to the second output in response to first of the data from the first temperature sensor and second of the data from the second temperature sensor.

6. The multi-segment, flexible, heated hose system recited in claim 1 wherein the power controller adjusts total of the power supplied to the first output and the second output in response to first of the data from the first temperature sensor and second of the data from the second temperature sensor.

7. The multi-segment, flexible, heated hose system recited in claim 1 wherein the first heater is an electric resistance heater.

8. The multi-segment, flexible, heated hose system recited in claim 1 wherein the first heater and the second heater are electric resistance heaters.

9. The multi-segment, flexible, heated hose system recited in claim 1 wherein the first heater comprises nickel-chromium alloy electrical conductor.

10. The multi-segment, flexible, heated hose system recited in claim 1 wherein the first heater comprises an electric resistance element having a polytetrafluoroethylene coating.

11. The multi-segment, flexible, heated hose system recited in claim 1 wherein the power controller is configured to supply a preselected amount of the power to the first heater in response to an absence of first of the data received from the first temperature sensor.

12. The multi-segment, flexible, heated hose system recited in claim 11 wherein the preselected amount of the power is zero.

13. The hose system of claim 1, wherein the first segment comprises:

a first pressure housing having the first fluid inlet in communication with the first flow channel, the first pressure housing having a first pressure-sealed connection through which a first portion of the first heater passes to the first flow channel; and a second pressure housing having the first fluid outlet in communication with the first flow channel, the second pressure housing having a second pressure-sealed connection through which a second portion of the first heater passes to the first flow channel.

14. The hose system of claim 13, wherein the first segment comprises a first swivel connector connected to the first pressure housing and disposed in communication with the first fluid inlet.

15. The hose system of claim 14, wherein the first segment comprises a second swivel connector connected to the second pressure housing, disposed in communication with the first fluid outlet, and connected to the second fluid inlet of the second segment.

16. The hose system of claim 13, wherein the second pressure housing comprise a port disposed in communication with the first flow channel; and wherein the first temperature sensor is disposed in the port.

17. The hose system of claim 13, wherein the first segment comprises:

a first hydraulic hose crimp crimped to a first end of the first hose and connected to a first through-port of the first pressure housing; and a second hydraulic hose crimp crimped to a second end of the first hose and connected to a second through-port of the first pressure housing.

18. The hose system of claim 13, wherein the second segment comprises:
- a third pressure housing connected to the second pressure housing of the first segment, the third pressure housing having the second fluid inlet in communication with the second flow channel, the third pressure housing having a third pressure-sealed connection through which a third portion of the second heater passes to the second flow channel; and
- a fourth pressure housing having the second fluid outlet in communication with the second flow channel, the fourth pressure housing having a fourth pressure-sealed connection through which a fourth portion of the second heater passes to the fourth flow channel.

19. The hose system of claim 1, wherein the power controller is configured to maintain the isocyanate at a first selected temperature with first and second of the power supplied to the first and second heaters in response to the data from the first and second temperature sensors; and wherein the power controller is configured to maintain the polyol resin at a second selected temperature with third and fourth of the power supplied to the third and fourth heaters in response to the data from the third and fourth temperature sensors.

20. A method of applying spray foam from isocyanate and polyol resin, the method comprising:
- providing the multi-segment, flexible, heated hose system according to claim 1;
- pumping the isocyanate at a first selected temperature to the spray gun via the first multi-segment, heated flexible hose;
- pumping the polyol resin at a second selected temperature to the spray gun via the second multi-segment, heated flexible hose;
- mixing the isocyanate and the polyol resin in the spray gun;
- maintaining the first selected temperature by supplying first power with the power controller to the first heater in response to the first temperature sensor and the second heater in response to the second temperature sensor; and
- maintaining the second selected temperature by supplying second power with the power controller to the third heater in response to the third temperature sensor and the fourth heater in response to the fourth temperature sensor.

* * * * *